(12) United States Patent  (10) Patent No.: US 9,104,548 B2
Norair  (45) Date of Patent: Aug. 11, 2015

(54) METHOD AND APPARATUS FOR MEMORY MANAGEMENT

(75) Inventor: John Peter Norair, San Francisco, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 372 days.

(21) Appl. No.: 13/354,513

(22) Filed: Jan. 20, 2012

(65) Prior Publication Data

US 2012/0191901 A1      Jul. 26, 2012

Related U.S. Application Data

(60) Provisional application No. 61/461,611, filed on Jan. 21, 2011.

(51) Int. Cl.
G06F 12/02  (2006.01)

(52) U.S. Cl.
CPC ............ *G06F 12/0246* (2013.01); *G06F 12/02* (2013.01); *G06F 2212/7202* (2013.01)

(58) Field of Classification Search
CPC .............................................. G06F 2212/7202
USPC ..................................................... 711/1–200
See application file for complete search history.

(56) References Cited

U.S. PATENT DOCUMENTS

| | | |
|---|---|---|
| 5,338,625 A | 8/1994 | Bates |
| 5,615,366 A | 3/1997 | Hansen |
| 5,729,557 A | 3/1998 | Gardner et al. |
| 5,959,281 A | 9/1999 | Domiteaux |
| 6,115,379 A | 9/2000 | Flanders et al. |
| 6,307,846 B1 | 10/2001 | Willey |
| 6,330,700 B1 | 12/2001 | Morris |

(Continued)

FOREIGN PATENT DOCUMENTS

| | | |
|---|---|---|
| EP | 1321009 B1 | 1/2007 |
| WO | 2006001556 A1 | 1/2006 |
| WO | 2009023592 A2 | 2/2009 |

OTHER PUBLICATIONS

PCT International Searching Authority, Notification Concerning Transmittal of the International Search Report and the Written Opinion of the International Searching Authority, or the Declaration, in International application No. PCT/US2011/55118, dated Feb. 28, 2012. (25 pages).

(Continued)

*Primary Examiner* — Cheng-Yuan Tseng
*Assistant Examiner* — Zubair Ahmed
(74) *Attorney, Agent, or Firm* — McAndrews, Held & Malloy, Ltd.

(57) ABSTRACT

One or more circuits of a device may comprise a memory. A first portion of a first block of the memory may store program code and/or program data, a second portion of the first block may store an index associated with a second block of the memory, and a third portion of the first block may store an indication of a write status of the first portion. Each bit of the third portion of the first block may indicate whether an attempt to write data to a corresponding one or more words of the first portion of the first block has failed since the last erase of the corresponding one or more words of the first portion of the first block. Whether data to be written to a particular virtual address is written to the first block or the second block may depend on the write status of the first block and the second block.

18 Claims, 9 Drawing Sheets

(56) References Cited

U.S. PATENT DOCUMENTS

| | | |
|---|---|---|
| 6,381,243 B1 | 4/2002 | Ekstedt |
| 6,388,997 B1 | 5/2002 | Scott |
| 6,424,301 B1 | 7/2002 | Johnson |
| 6,452,569 B1 | 9/2002 | Park |
| 6,549,959 B1 | 4/2003 | Yates |
| 6,665,308 B1 | 12/2003 | Rakib |
| 6,700,491 B2 | 3/2004 | Shafer |
| 6,705,531 B1 | 3/2004 | Norton |
| 6,714,559 B1 | 3/2004 | Meier |
| 6,771,985 B1 | 8/2004 | Iinuma |
| 7,009,941 B1 | 3/2006 | Uchino |
| 7,233,603 B2 | 6/2007 | Lee |
| 7,280,555 B2 | 10/2007 | Stanforth |
| 7,305,237 B2 | 12/2007 | Stephens |
| 7,308,103 B2 | 12/2007 | Corcoran et al. |
| 7,315,248 B2 | 1/2008 | Egbert |
| 7,330,446 B2 | 2/2008 | Lee |
| 7,369,512 B1 | 5/2008 | Shurbanov et al. |
| 7,554,981 B2 | 6/2009 | Kecskemeti |
| 7,580,397 B2 | 8/2009 | Arai |
| 7,606,256 B2 | 10/2009 | Vitebsky |
| 7,643,509 B2 | 1/2010 | Han et al. |
| 7,672,284 B2 | 3/2010 | Sugar et al. |
| 7,689,195 B2 | 3/2010 | Wu |
| 7,698,463 B2 | 4/2010 | Ogier et al. |
| 7,735,116 B1 | 6/2010 | Gauvin |
| 7,805,129 B1 | 9/2010 | Issa |
| 7,814,107 B1 | 10/2010 | Thirumalai et al. |
| 7,890,839 B2 | 2/2011 | Iwami |
| 7,962,361 B2 | 6/2011 | Ramchandani |
| 8,035,488 B2 | 10/2011 | Shiotsu |
| 8,325,665 B2 | 12/2012 | Kim et al. |
| 8,351,409 B2 | 1/2013 | Albert |
| 8,554,271 B2 | 10/2013 | Wang |
| 2002/0025823 A1 | 2/2002 | Hara |
| 2002/0078045 A1 | 6/2002 | Dutta |
| 2002/0108045 A1* | 8/2002 | Wells .............. 713/182 |
| 2003/0115369 A1 | 6/2003 | Walter |
| 2003/0154243 A1 | 8/2003 | Crockett |
| 2003/0183691 A1 | 10/2003 | Lahteenmaki |
| 2004/0157631 A1 | 8/2004 | Stobart |
| 2004/0218557 A1 | 11/2004 | Kim et al. |
| 2005/0078038 A1 | 4/2005 | Takaki |
| 2005/0083943 A1 | 4/2005 | Lee et al. |
| 2005/0128086 A1 | 6/2005 | Brown |
| 2005/0135291 A1 | 6/2005 | Ketchum et al. |
| 2005/0139685 A1 | 6/2005 | Kozlay |
| 2005/0174953 A1 | 8/2005 | Ho |
| 2005/0177633 A1 | 8/2005 | Plunkett |
| 2006/0002312 A1 | 1/2006 | Delattre et al. |
| 2006/0061795 A1 | 3/2006 | Walmsley |
| 2006/0088021 A1 | 4/2006 | Nelson et al. |
| 2006/0091223 A1 | 5/2006 | Zellner |
| 2006/0175420 A1 | 8/2006 | Satou |
| 2006/0219776 A1 | 10/2006 | Finn |
| 2006/0220867 A1 | 10/2006 | Dixon |
| 2007/0000316 A1 | 1/2007 | Lauer |
| 2007/0010928 A1 | 1/2007 | Brusarosco |
| 2007/0058661 A1 | 3/2007 | Chow |
| 2007/0083697 A1* | 4/2007 | Birrell et al. .......... 711/103 |
| 2007/0083924 A1 | 4/2007 | Lu |
| 2007/0099641 A1 | 5/2007 | Lastinger |
| 2007/0125836 A1 | 6/2007 | McAllister et al. |
| 2007/0136509 A1* | 6/2007 | Agami .............. 711/103 |
| 2007/0211532 A1 | 9/2007 | Gonalez |
| 2007/0232281 A1 | 10/2007 | Nakai |
| 2007/0295074 A1 | 12/2007 | Kobayakawa |
| 2008/0041936 A1 | 2/2008 | Vawter |
| 2008/0069097 A1 | 3/2008 | Motegi |
| 2008/0075123 A1 | 3/2008 | Fourcand |
| 2008/0107060 A1 | 5/2008 | Andou et al. |
| 2008/0120488 A1* | 5/2008 | Woo et al. ............ 711/209 |
| 2008/0130597 A1 | 6/2008 | Kalhan |
| 2008/0164325 A1 | 7/2008 | Borracci |
| 2008/0172357 A1 | 7/2008 | Rechis |
| 2008/0186857 A1 | 8/2008 | Becker |
| 2008/0186867 A1 | 8/2008 | Schoo et al. |
| 2008/0209322 A1 | 8/2008 | Kaufman |
| 2008/0228592 A1 | 9/2008 | Kotas |
| 2008/0238621 A1 | 10/2008 | Rofougaran |
| 2008/0256409 A1 | 10/2008 | Oran et al. |
| 2008/0302177 A1 | 12/2008 | Sinnett |
| 2008/0320139 A1 | 12/2008 | Fukuda |
| 2009/0003376 A1 | 1/2009 | Horvat |
| 2009/0006376 A1 | 1/2009 | Hendriks et al. |
| 2009/0034491 A1 | 2/2009 | Adams |
| 2009/0055377 A1 | 2/2009 | Hedge |
| 2009/0069049 A1 | 3/2009 | Jain |
| 2009/0073070 A1 | 3/2009 | Rofougaran |
| 2009/0113267 A1 | 4/2009 | Harrison |
| 2009/0138948 A1 | 5/2009 | Calamera |
| 2009/0141531 A1 | 6/2009 | Abedin |
| 2009/0171749 A1 | 7/2009 | Laruelle |
| 2009/0171947 A1 | 7/2009 | Karayel |
| 2009/0172269 A1* | 7/2009 | Song et al. .............. 711/103 |
| 2009/0210898 A1 | 8/2009 | Childress et al. |
| 2009/0251295 A1 | 10/2009 | Norair |
| 2009/0268674 A1 | 10/2009 | Liu |
| 2009/0279652 A1 | 11/2009 | Sinha |
| 2009/0286496 A1 | 11/2009 | Yavuz et al. |
| 2009/0292418 A1 | 11/2009 | Kuykendal |
| 2010/0011156 A1* | 1/2010 | Yim et al. .............. 711/103 |
| 2010/0026589 A1 | 2/2010 | Dou |
| 2010/0036806 A1 | 2/2010 | Lam et al. |
| 2010/0052859 A1 | 3/2010 | Lossau |
| 2010/0078471 A1 | 4/2010 | Lin |
| 2010/0082893 A1 | 4/2010 | Ma |
| 2010/0097957 A1 | 4/2010 | Pirzada et al. |
| 2010/0177696 A1 | 7/2010 | Jung |
| 2010/0179877 A1 | 7/2010 | Lam |
| 2010/0181377 A1 | 7/2010 | Chen |
| 2010/0190437 A1 | 7/2010 | Buhot |
| 2010/0197261 A1 | 8/2010 | Zibrik et al. |
| 2010/0228617 A1 | 9/2010 | Ransom et al. |
| 2010/0256976 A1 | 10/2010 | Atsmon |
| 2010/0261496 A1 | 10/2010 | Fukumoto et al. |
| 2010/0280904 A1 | 11/2010 | Ahuja |
| 2010/0293321 A1* | 11/2010 | Weingarten .............. 711/103 |
| 2010/0295681 A1 | 11/2010 | Burns et al. |
| 2010/0303051 A1 | 12/2010 | Umeuchi |
| 2011/0003607 A1 | 1/2011 | Forenza et al. |
| 2011/0007733 A1 | 1/2011 | Kubler et al. |
| 2011/0064013 A1 | 3/2011 | Liu |
| 2011/0074552 A1 | 3/2011 | Norair |
| 2011/0112892 A1 | 5/2011 | Tarantino |
| 2012/0001730 A1 | 1/2012 | Potyrailo |
| 2012/0086615 A1 | 4/2012 | Norair |
| 2012/0087267 A1 | 4/2012 | Norair |
| 2012/0087350 A1 | 4/2012 | Norair |
| 2012/0088449 A1 | 4/2012 | Norair |
| 2012/0093151 A1 | 4/2012 | McFarland |
| 2012/0116694 A1 | 5/2012 | Norair |
| 2012/0116887 A1 | 5/2012 | Norair |
| 2012/0118952 A1 | 5/2012 | Norair |
| 2012/0191848 A1 | 7/2012 | Norair |
| 2012/0207141 A1 | 8/2012 | Norair |
| 2012/0209716 A1 | 8/2012 | Burns |
| 2012/0224491 A1 | 9/2012 | Norair |
| 2012/0224530 A1 | 9/2012 | Norair |
| 2012/0224543 A1 | 9/2012 | Norair |
| 2012/0224590 A1 | 9/2012 | Norair |
| 2012/0225687 A1 | 9/2012 | Norair |
| 2012/0226822 A1 | 9/2012 | Norair |
| 2012/0226955 A1 | 9/2012 | Norair |
| 2013/0017788 A1 | 1/2013 | Norair |
| 2013/0210461 A1 | 8/2013 | Moldavsky |

OTHER PUBLICATIONS

PCT International Searching Authority, Notification Concerning Transmittal of the International Search Report and the Written Opinion of the International Searching Authority, or the Declaration, in International application No. PCT/US11/55082, dated Mar. 1, 2012 (13 pages).

(56) References Cited

OTHER PUBLICATIONS

PCT International Searching Authority, Notification Concerning Transmittal of the International Search Report and the Written Opinion of the International Searching Authority, or the Declaration, in International application No. PCT/US11/55934, dated Mar. 6, 2012 (11 pages).
PCT International Searching Authority, Notification Concerning Transmittal of the International Search Report and the Written Opinion of the International Searching Authority, or the Declaration, in International application No. PCT/US2011/055929, dated Jan. 30, 2012. (15 pages).
PCT International Searching Authority, Notification Concerning Transmittal of the International Search Report and the Written Opinion of the International Searching Authority, or the Declaration, in International application No. PCT/US2011/059292, dated Feb. 2, 2012. (12 pages).
PCT International Searching Authority, Notification Concerning Transmittal of the International Search Report and the Written Opinion of the International Searching Authority, or the Declaration, in International application No. PCT/US11/059304, dated Mar. 9, 2012 (11 pages).
PCT International Searching Authority, Notification Concerning Transmittal of the International Search Report and the Written Opinion of the International Searching Authority, or the Declaration, in International application No. PCT/US2011/060950, dated Mar. 16, 2012. (14 pages).
PCT International Searching Authority, Notification Concerning Transmittal of the International Search Report and the Written Opinion of the International Searching Authority, or the Declaration, in International application No. PCT/US12/22005, dated Mar. 29, 2012. (12 pages).
PCT International Searching Authority, Notification Concerning Transmittal of the International Search Report and the Written Opinion of the International Searching Authority, or the Declaration, in International application No. PCT/US12/22002, dated May 8, 2012. (13 pages).
PCT International Searching Authority, Notification Concerning Transmittal of the International Search Report and the Written Opinion of the International Searching Authority, or the Declaration, in International application No. PCT/US2012/025191 dated May 25, 2012 (8 pages).
PCT International Searching Authority, Notification Concerning Transmittal of the International Search Report and the Written Opinion of the International Searching Authority, or the Declaration, in International application No. PCT/US2012/025197 dated May 25, 2012 (7 pages).
PCT International Searching Authority, Notification Concerning Transmittal of the International.Search Report and the Written Opinion of the International Searching Authority, or the Declaration, in International application No. PCT/US2012/027382 dated May 31, 2012 (10 pages).
PCT International Searching Authority, Notification Concerning Transmittal of the International Search Report and the Written Opinion of the International Searching Authority, or the Declaration, in International application No. PCT/US2012/027381 dated May 31, 2012 (13 pages).
PCT International Searching Authority, Notification Concerning Transmittal of the International Search Report and the Written Opinion of the International Searching Authority, or the Declaration, in International application No. PCT/US2012/027387 dated Jun. 6, 2012 (14 pages).
PCT International Searching Authority, Notification Concerning Transmittal of the International Search Report and the Written Opinion of the International Searching Authority, or the Declaration, in International application No. PCT/US2012/27378 dated Jun. 13, 2012 (14 pages).
PCT International Searching Authority, Notification Concerning Transmittal of the International Search Report and the Written Opinion of the International Searching Authority, or the Declaration, in International application No. PCT/US2012/027379 dated Jun. 20, 2012 (16 pages).
PCT International Searching Authority, Notification Concerning Transmittal of the International Search Report and the Written Opinion of the International Searching Authority, or the Declaration, in International application No. PCT/US2012/027384 dated Jun. 20, 2012 (10 pages).
PCT Int'l Searching Authority, Notification Concerning Transmittal of the Int'l Search Report and the Written Opinion of the Int'l Searching authority or the Declaration in Int'l application No. PCT/US2012/027386 dated Oct. 16, 2012.
Int'l Prelim. Report on Patentability for PCT/US2011/055082 dated Apr. 18, 2013.
Int'l Prelim. Report on Patentability for PCT/US2011/055934 dated Apr. 25, 2013.
Norair JP (2009). Introduction to DASH7 Technologies 1 st Edition. Whitepaper. Mar. 16, 2009. 1-22.
Richard MacManus. DASH7: Bringing Sensor Networking to Smartphones. readwrite.com. Apr. 11, 2010, pp. 1-5.

\* cited by examiner

| 114 | | Word 0 | Word 1 | Word 2 | Word 3 | | f0 | f1 | f2 | f3 | |
|---|---|---|---|---|---|---|---|---|---|---|---|
| Index i1 | 116j | 11111111 | 11111111 | 11111111 | 11111111 | Index i4 | 1 | 1 | 1 | 1 | ←116j |
| Index i4 | 116k | 11111111 | 11111111 | 11111111 | 11111111 | Index i1 | 1 | 1 | 1 | 1 | ←116k |

FIG. 7A

After first write to virtual address:

| 114 | | Word 0 | Word 1 | Word 2 | Word 3 | | f0 | f1 | f2 | f3 | |
|---|---|---|---|---|---|---|---|---|---|---|---|
| Index i1 | 116j | 11011011 | 01100110 | 10111011 | 11011011 | Index i4 | 1 | 1 | 1 | 1 | ←116j |
| Index i4 | 116k | 11111111 | 11111111 | 11111111 | 11111111 | Index i1 | 1 | 1 | 1 | 1 | ←116k |

FIG. 7B

After second write to same virtual address:

| 114 | | Word 0 | Word 1 | Word 2 | Word 3 | | f0 | f1 | f2 | f3 | |
|---|---|---|---|---|---|---|---|---|---|---|---|
| Index i1 | 116j | 11011011 | 01100110 | 10111011 | 11011011 | Index i4 | 1 | 0 | 1 | 1 | ←116j |
| Index i4 | 116k | 11111111 | 1001001 | 11111111 | 11111111 | Index i1 | 1 | 1 | 1 | 1 | ←116k |

FIG. 7C

After copying contents of primary to fallow (1st stage of recombination):

| 114 | | Word 0 | Word 1 | Word 2 | Word 3 | | f0 | f1 | f2 | f3 | |
|---|---|---|---|---|---|---|---|---|---|---|---|
| Index i1 | 116j | 11011011 | 01100110 | 10111011 | 11011011 | Index i4 | 1 | 0 | 1 | 1 | ←116j |
| Index i4 | 116k | 11011011 | 1001001 | 10111011 | 11011011 | Index i1 | 1 | 1 | 1 | 1 | ←116k |

FIG. 7D

After erasing primary block (2$^{nd}$ stage of recombination):

| 114 | | Word 0 | Word 1 | Word 2 | Word 3 | | f0 | f1 | f2 | f3 | |
|---|---|---|---|---|---|---|---|---|---|---|---|
| index i1 | 116$_j$ | 11111111 | 11111111 | 11111111 | 11111111 | index i4 | 1 | 1 | 1 | 1 | ← 116$_j$ |
| index i4 | 116$_k$ | 11011011 | 1001001 | 10111011 | 11011011 | index i1 | 1 | 1 | 1 | 1 | ← 116$_k$ |

FIG. 7E

After updating indices (3$^{rd}$ stage of recombination):

| 114 | | Word 0 | Word 1 | Word 2 | Word 3 | | f0 | f1 | f2 | f3 | |
|---|---|---|---|---|---|---|---|---|---|---|---|
| index i1 | 116$_k$ | 11111111 | 11111111 | 11111111 | 11111111 | index i1 | 1 | 1 | 1 | 1 | ← 116$_j$ |
| index i4 | 116$_j$ | 11011011 | 1001001 | 10111011 | 11011011 | index i4 | 1 | 1 | 1 | 1 | ← 116$_k$ |

FIG. 7F

After third write to same virtual address

| 114 | | Word 0 | Word 1 | Word 2 | Word 3 | | f0 | f1 | f2 | f3 | |
|---|---|---|---|---|---|---|---|---|---|---|---|
| index i1 | 116$_k$ | 11111111 | 11010001 | 11111111 | 11111111 | index i1 | 1 | 1 | 1 | 1 | ← 116$_j$ |
| index i4 | 116$_j$ | 11011011 | 1001001 | 10111011 | 11011011 | index i4 | 1 | 0 | 1 | 1 | ← 116$_k$ |

FIG. 7G

After copying contents of primary to fallow (1st stage of recombination):

| 114 | | Word 0 | Word 1 | Word 2 | Word 3 | | f0 | f1 | f2 | f3 | |
|---|---|---|---|---|---|---|---|---|---|---|---|
| Index i1 | 116j | 11011011 | 01100110 | 10111011 | 11011011 | Index i4 | 1 | 1 | 1 | 1 | ← 116j |
| index i4 | 116k | (11011011) | 1001001 | (10111011) | (11011011) | index i1 | 1 | 1 | 1 | 1 | ← 116k |
| ⋮ | | | | | | | | | | | |
| | | 11111111 | 11111111 | 11111111 | 11111111 | (empty) | 1 | 1 | 1 | 1 | ← 116l |
| | | | | ⋮ | | | | | | | |

FIG. 8A

After erasing primary block (2nd stage of recombination):

| 114 | | Word 0 | Word 1 | Word 2 | Word 3 | | f0 | f1 | f2 | f3 | |
|---|---|---|---|---|---|---|---|---|---|---|---|
| index i1 | 116j | (11111111) | (11111111) | (11111111) | (11111111) | index i4 | 1 | 1 | 1 | 1 | ← 116j |
| Index i4 | 116k | 11011011 | 1001001 | 10111011 | 11011011 | index i1 | 1 | 1 | 1 | 1 | ← 116k |
| ⋮ | | | | | | | | | | | |
| | | 11111111 | 11111111 | 11111111 | 11111111 | (empty) | 1 | 1 | 1 | 1 | ← 116l |
| | | | | ⋮ | | | | | | | |

FIG. 8B

After updating Indices (3rd stage of recombination):

| 114 | | Word 0 | Word 1 | Word 2 | Word 3 | | f0 | f1 | f2 | f3 | |
|---|---|---|---|---|---|---|---|---|---|---|---|
| Index i1 | (116k) | 11111111 | 11111111 | 11111111 | 11111111 | (empty) | 1 | 1 | 1 | 1 | ← 116j |
| index i4 | (116l) | 11011011 | 1001001 | 10111011 | 11011011 | (index i4) | 1 | 1 | 1 | 1 | ← 116k |
| ⋮ | | | | | | | | | | | |
| | | 11111111 | 11111111 | 11111111 | 11111111 | (Index i1) | 1 | 1 | 1 | 1 | ← 116l |
| | | | | ⋮ | | | | | | | |

METHOD AND APPARATUS FOR MEMORY MANAGEMENT

CLAIM OF PRIORITY

This patent application makes reference to, claims priority to and claims benefit from U.S. Provisional Patent Application Ser. No. 61/461,611 entitled "Low-level filesystem architecture for resource-constrained NAND flash devices" and filed on Jan. 21, 2011.

The above stated application is hereby incorporated herein by reference in its entirety.

INCORPORATION BY REFERENCE

This patent application also makes reference to:

U.S. Provisional Patent Application Ser. No. 61/464,376 entitled "Advanced communication system for wide-area low power wireless applications and active RFID" and filed on Mar. 2, 2011; and U.S. patent application Ser. No. 13/270,802 entitled "Method and Apparatus for a Multi-band, Multi-mode Smartcard" and filed on Oct. 11, 2011.

Each of the above stated applications is hereby incorporated herein by reference in its entirety.

FIELD OF THE INVENTION

Certain embodiments of the invention relate to electronics. More specifically, certain embodiments of the invention relate to a method and apparatus for memory management.

BACKGROUND OF THE INVENTION

Conventional methods and systems for memory management are inefficient. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

An apparatus and/or method is provided for memory management, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

FIGS. 7A-7G illustrate a series of write operations and a resulting recombination of memory blocks.

FIGS. 8A-8C illustrate an exemplary recombination of blocks of memory.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "for example" and "e.g.," introduce a list of one or more non-limiting examples, instances, or illustrations.

Figure 1:
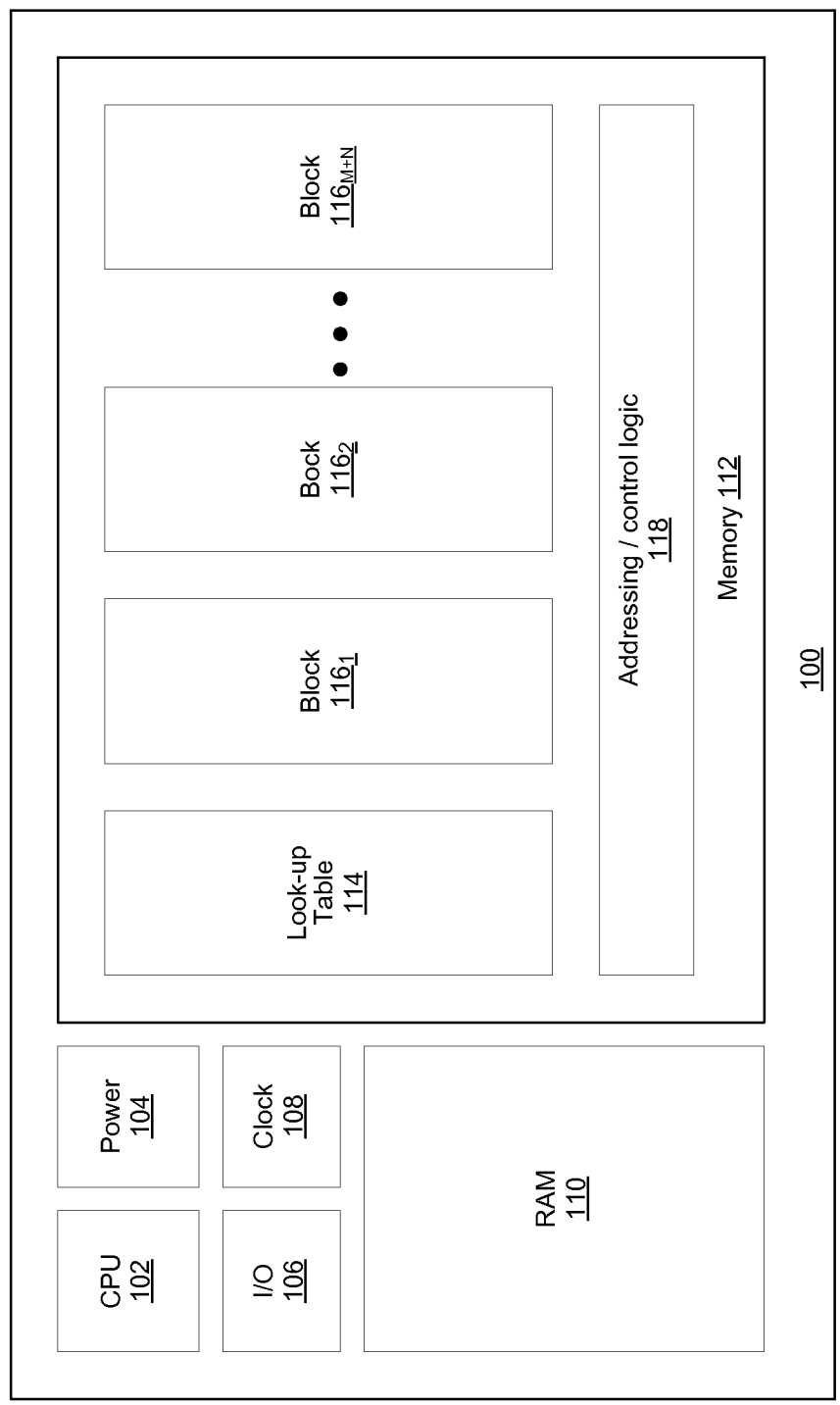
FIG. 1 depicts an exemplary electronic device which manages its memory in accordance with an embodiment of the invention.

FIG. 1 depicts an exemplary electronic device which manages its memory in accordance with an embodiment of the invention. The device 100 comprises a CPU module 102, a power management module 104, an input-output module 106, a clock 108, a random access memory (RAM) module 110, and a memory module 112. In an exemplary embodiment of the invention, the device 100 may be a microcontroller which is realized on a silicon die and integrated in, for example, a smartcard such as is described in the above-incorporated U.S. patent application Ser. No. 13/270,802.

The CPU 102 may be operable to control operation of the device 100. The CPU 102 may, for example, execute instructions and perform arithmetic and/or logic operations in response to the executed instructions. The CPU 102 may generate one or more control signals for controlling the operation of the device 100.

The power management module 104 may be operable to condition received power for distribution to various components of the device 100. The power management module 104 may, for example, receive a single voltage (e.g., from a battery) and regulate the voltage to generate a plurality of voltages which may then be distributed to the various components of the device 100.

The input-output module 106 may be operable to communicate with other devices using one or more proprietary and/or or standardized communication protocols (e.g., I²C, SPI, UART, etc.).

The clock 108 may be operable to generate one or more oscillating signals which may be utilized to control synchronous circuitry of the device 100. The clock 108 may comprise, for example, one or more crystal oscillators, phase-locked loops, and/or direct digital synthesizers.

The RAM module 110 may comprise dynamic RAM operable to store runtime data. The memory cells of the RAM module 110 may be volatile such that their contents may be lost relatively-quickly when the RAM module 110 is powered down.

The memory module 112 may comprise addressing/control logic 118 which implements read and write operations in response to read and write commands issued to the memory module 112. The memory module 112 may comprise non-volatile memory cells operable to store data that is persistent over multiple power cycles of the device 100. The memory cells may be organized into a look-up table 114 and blocks of memory $116_1$-$116_{M+N}$. An exemplary memory block $116_X$ corresponding to one of the blocks $116_1$-$116_{M+N}$ is described below with respect to FIG. 2, for example. An exemplary look-up table 114 is described below with respect to FIG. 3, for example.

In an exemplary embodiment, the memory module 112 may comprise NAND flash memory which is arranged as described below with respect to FIG. 2, for example. While such an architecture may be efficient in terms of cost and physical area, a drawback of such an architecture is that memory words can only be erased as part of a batch-erase which erases the contents of multiple memory words. For example, erasing any memory word of the block $116_1$ may require erasing all words of block $116_1$.

In an exemplary embodiment, each of the blocks $116_1$-$116_{M+N}$ may be assigned a unique index and the indices may be utilized for converting a virtual address to a physical address, as described below with respect to FIG. 3, for example. In an exemplary embodiment, one or more of the memory blocks $116_1$-$116_{M+N}$ may be designated as primary blocks and one or more of the memory blocks $116_1$-$116_{M+N}$ may be designated as fallow blocks. The distinction between primary and fallow memory blocks may be utilized to determine which physical address to access when reading from and writing to the memory 112, as is described in further detail below with respect to FIGS. 3-8C, for example.

In operation, the CPU 100 may execute program code that is stored in the memory 112 causing the device 100 to operate in accordance with the code. Execution of the program code causes reading of program code and/or data (e.g., parameters utilized during execution of the program code) from the memory module 112. An exemplary manner in which such read operations are carried out is described below with respect to FIG. 4, for example. Reading of program code and/or data from memory 112 of course requires the code and/or data to have been written to the memory 112 in the first place. An exemplary manner in which program data and/or code may be written to the memory 112 is described below with respect to FIGS. 5 and 7A-7G, for example. Such write operations may be carried out, for example, in response to instructions from a programming station connected via I/O module 106. Such write operations may also be carried out, for example, in response to instructions from the CPU 102 during runtime when program data needs to be updated and/or when the module 112 is utilized for runtime data (e.g., due to RAM 110 being full).

Figure 2:
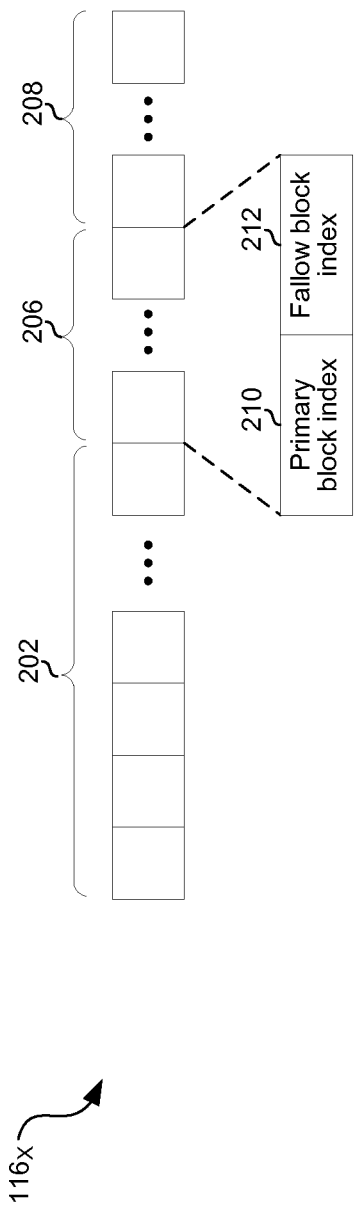
FIG. 2 depicts an exemplary block of memory organized in accordance with an embodiment of the invention.

FIG. 2 depicts an exemplary block of memory organized in accordance with an embodiment of the invention. The block of memory $116_X$ shown in FIG. 2 comprises a first portion 202, a second portion 206, and a third portion 208. In an exemplary embodiment, each of the blocks $116_1$-$116_{M+N}$ may be organized like the block $116_X$.

The first portion 202 of the memory block $116_X$ comprises one or more memory cells operable to store one or more words of information, where each word may be one or more bits in length. In an exemplary embodiment, program code and/or program data may be stored in first portion 202.

The second portion 206 of the memory block $116_X$ comprises one or more memory cells operable to store one or more words of information. In an exemplary embodiment, the second portion 206 of the memory block $116_X$ may comprise a field 210 which may store an index associated with one of the memory blocks $116_1$-$116_{M+N}$ that has been designated as a primary block. In an exemplary embodiment, the second portion 206 of the memory block $116_X$ may comprise a field 212 which may store an index associated with one of the memory blocks $116_1$-$116_{M+N}$ that has been designated as a fallow block. In this regard, a primary memory block may be associated with a fallow block by storing the index of the fallow memory block in field 212 of the primary block and storing the index of the primary block in field 210 of the fallow block. For example, if the block $116_X$ has been designated as a primary memory block, then the index stored in field 210 may be the index associated with the block $116_X$ and the index stored in field 212 may be the index of a block $116_Y$ that has been designated as a fallow block. Conversely, if the block $116_X$ has been designated as a fallow block, then the index stored in field 212 may be the index associated with the block $116_X$ and the index stored in field 210 may be the index of a block $116_Y$ that has been designated as a primary block. In an exemplary embodiment, a value in field 212 that is beyond the range of valid indices may indicate that the block $116_X$ is not a fallow block and has not been associated with the block $116_X$.

The third portion 208 of the memory block $116_X$ comprises one or more memory cells operable to store indications of whether an attempt to write data to the portion 202 has failed since the last time the portion 202 has been erased. A write attempt may fail, for example, because the portion 202 has been written to more recently than it has been erased. Such write failures arise from, for example, the limitations of NAND flash architecture that allows only per-block erase (and not erasure of individual words of a block). In an exemplary embodiment, each bit of the third portion 208 may indicate whether a corresponding one or more words of the first portion 202 have had a write failure since the last erase of the block $116_X$. Those words of the portion 202 for which the corresponding bit(s) of the portion 208 are asserted (that is, those memory cells of the portion 202 that have had a write failure since the last erase of the block $116_X$) may be said to be "closed." Those words of the portion 202 for which the corresponding bit(s) of the portion 208 are deasserted (that is, those memory cells of the portion 202 that have not had a write failure since the last erase of the block $116_X$) may be said to be "open."

Figure 3:
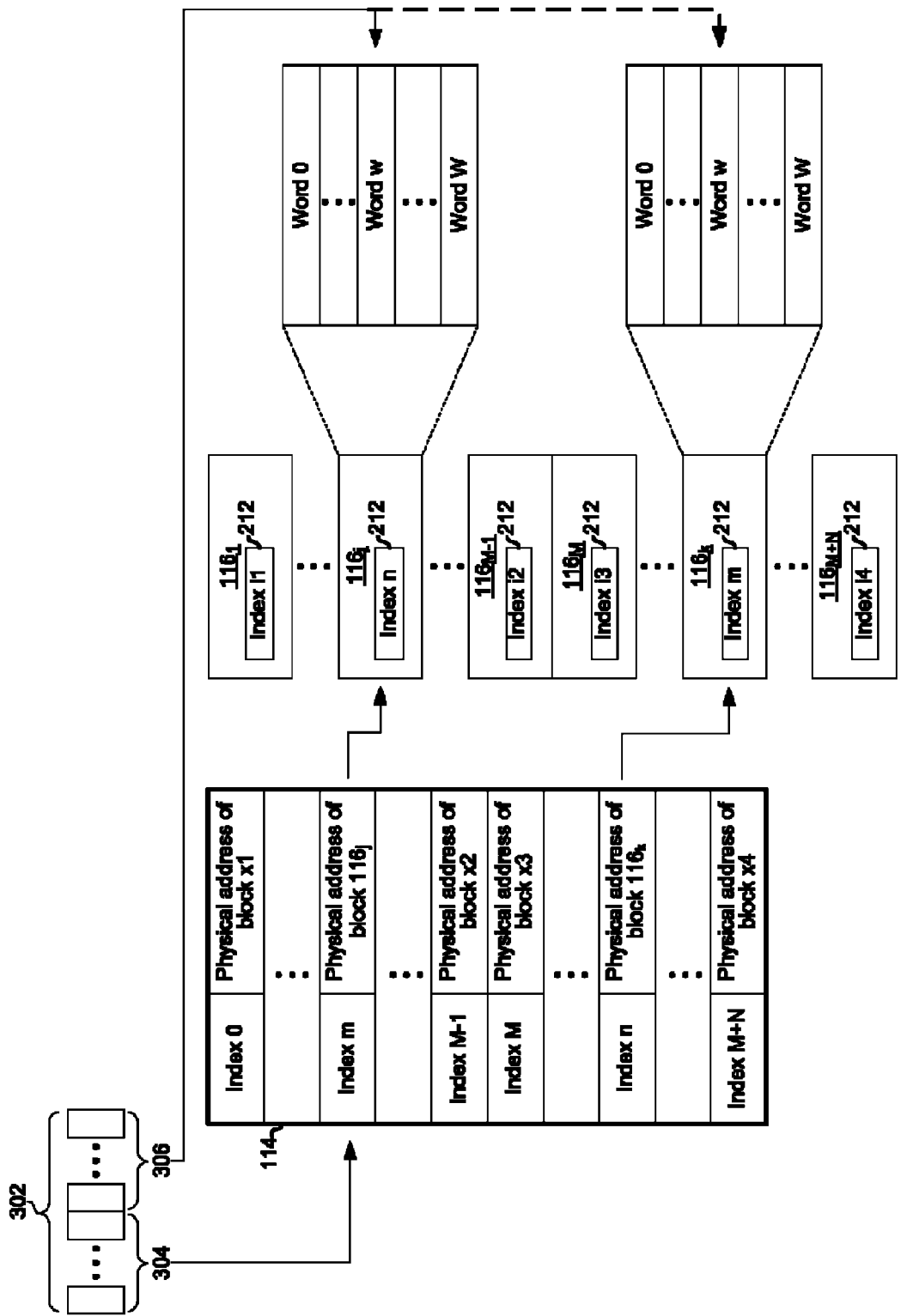
FIG. 3 depicts determining a physical address from a virtual address, in accordance with an embodiment of the invention.

FIG. 3 depicts determining a physical address from a virtual address, in accordance with an embodiment of the invention. Shown in FIG. 3, a virtual address 302 comprises a first portion 304 and a second portion 306. The first portion 304 may determine which one of the blocks $116_1$-$116_{M+N}$ is to be read from or written to, and the portion 306 of the virtual address may determine which word(s) within the block is/are to be read from or written to. For example, in the embodiment shown in FIG. 3, each block comprises W words, the portion 304 of the virtual address 302 maps to block $116_j$, and the portion 306 of the virtual address 302 corresponds to an address offset of w words, where word size in the memory module 112 may be one or more bits, and the address offset may be counted in units of single words or multiple words (e.g., for batch read/write).

In instances that a fallow block has been associated with a primary block, the fallow block may be read from or written to by first reading the index of the fallow block from the primary block, mapping the index to the physical address of the fallow block using table 114, and then using the portion 306 of the virtual address 302 to determine an address offset within the fallow block. For example, in the embodiment shown in FIG. 3, index n is stored in field 212 of block $116_j$, index n maps to block $116_k$ in table 114, and the portion 306 of virtual address 302 corresponds to an address offset of w words.

Figure 4:
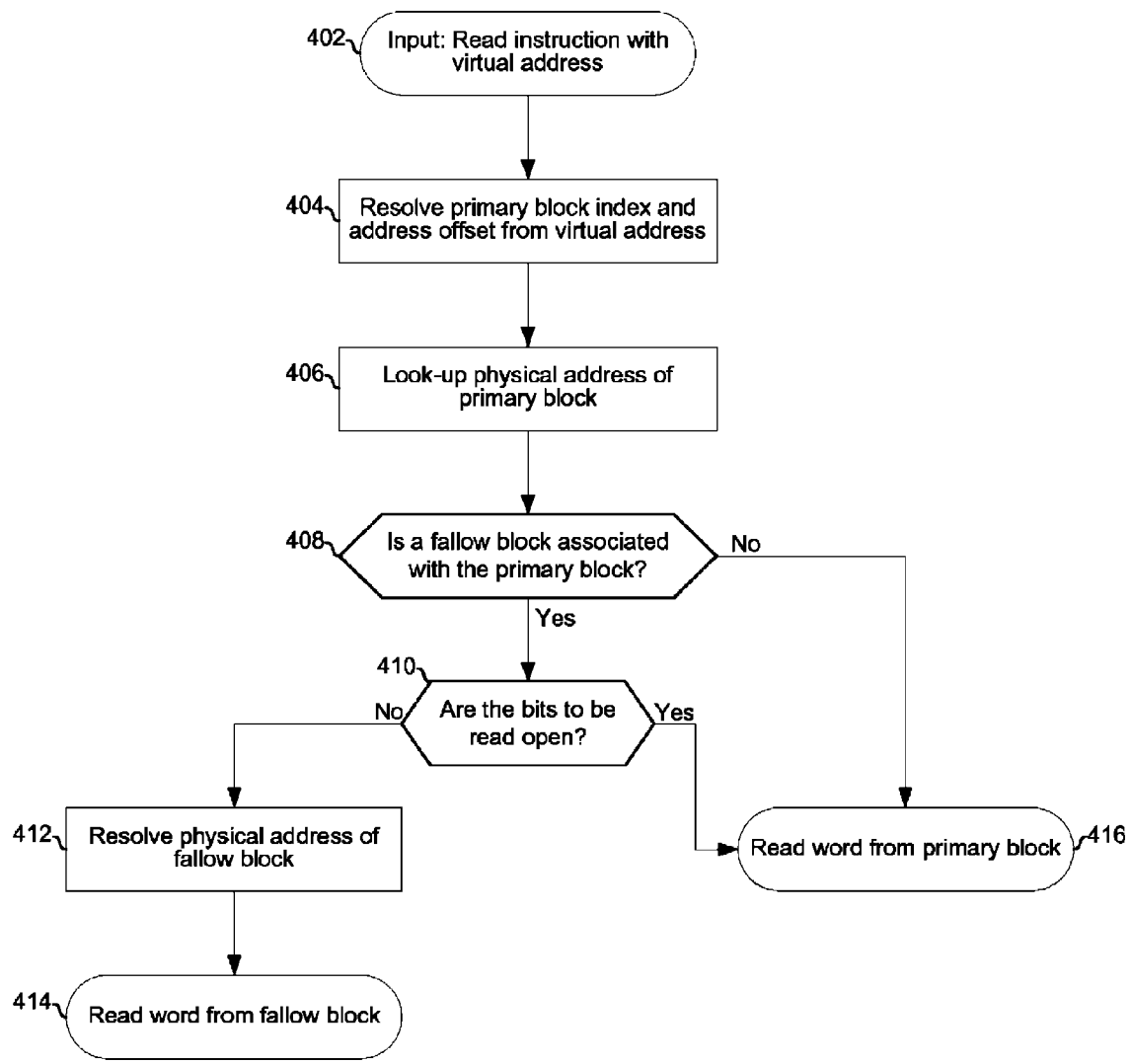
FIG. 4 is a flowchart illustrating exemplary steps for reading from a memory that is managed in accordance with an embodiment of the invention.

FIG. 4 is a flowchart illustrating exemplary steps for reading from a memory that is managed in accordance with an embodiment of the invention. The exemplary steps begin with step 402 in which an instruction to read from a particular virtual address is input to the memory 402.

In step 404, the index of the primary block to be read from, and the address offset of the word(s) to be read, are determined from the virtual address. For example, the index may be determined from a first portion of the virtual address and the address offset may be determined from a second portion of the virtual address. For non-limiting illustration purposes only, the remainder of the description of FIG. 4 assumes the result of step 404 is a determination that the index of the primary block is m and that the address offset is w.

In step 406, the index determined in step 404 is used to determine a corresponding physical address of the primary block. For example, the index m is input to the look-up table 114 and the physical address of the primary block $116_j$ is output by the look-up table.

In step 408, it is determined whether a fallow block has been associated with the primary block $116_j$. For example, if the value of the field 212 of the block $116_j$ is above a threshold, it may be determined that no fallow block has been associated with the block $116_j$, but if the value of the field 212 of the block $116_j$ is below the threshold, it may be determined that a fallow block has been associated with the block $116_j$. If there is no associated fallow block, the exemplary steps may proceed to step 416. In step 416, the word or words at address offset w of block $116_j$ are read and output from the memory module 112.

Returning to step 408, if there is an associated fallow block, then the exemplary steps may proceed to step 410. In step 410, it is determined whether the word or words at address offset w of block $116_j$ are open (i.e., have not had a write failure since the last erase of the block $116_j$). If the word(s) are open, then the exemplary steps may proceed to step 416.

Returning to step 410, if the word or words at address offset w of block $116_j$ are closed, then the exemplary steps may proceed to step 412. In step 412, the physical address of the associated fallow block may be determined. The physical address of the fallow block may be determined by reading the index from field 212 of the block $116_j$, and using the index to determine the physical address (e.g., via a look-up table) of the fallow block. For non-limiting illustration purposes only, it is assumed in step 414 that block $116_k$ has been designated as a fallow block and associated with the block $116_j$. Subsequent to step 412, the exemplary steps may proceed to step 414. In step 414, the word(s) at address offset w of block $116_k$ are read and output from the memory module 112.

Figure 5:
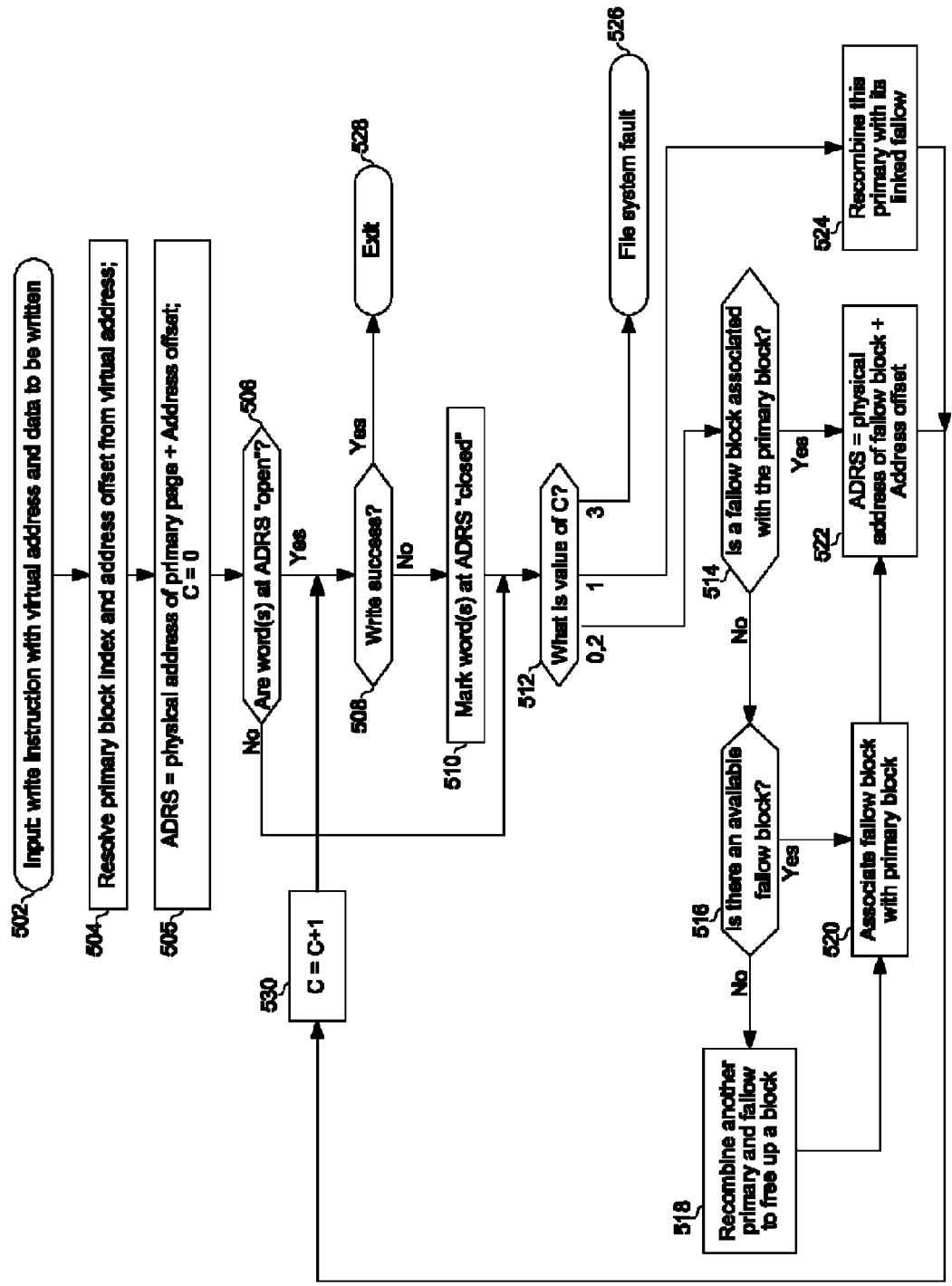
FIG. 5 is a flowchart illustrating exemplary steps for writing to a memory that is managed in accordance with an embodiment of the invention.

FIG. 5 is a flowchart illustrating exemplary steps for writing to a memory that is managed in accordance with an embodiment of the invention. The exemplary steps begin with step 502 in which an instruction to write data to a virtual address is input to the memory 402.

In step 504, the index of the primary block to be written to, and the address offset of the word or words to be written to, are determined from the virtual address. For example, the index may be determined from a first portion of the virtual address and the address offset may be determined from a second portion of the virtual address. For non-limiting illustration purposes only, the remainder of the description of FIG. 5 assumes the result of step 504 is a determination that the primary block to be written to is block $116_j$, and that the word(s) to be written to are at address offset w.

In step 505, the variable ADRS is set to the physical address of the word(s) having an address offset w in block $116_j$. Also in step 505, the variable C is set to 0.

In step 506, it is determined whether the word(s) located at the physical address ADRS are open (i.e., have not had a write failure since the last erase of the block $116_j$). If so, then the exemplary steps proceed to step 508.

In step 508, an attempt is made to write the data received in step 502 to the word(s) having the physical address ADRS. If the write is successful, then the exemplary steps proceed to step 528 and the write operation is complete.

Returning to step 508, if the write operation is unsuccessful (e.g., because the memory cells at ADRS have already been written to since the last erase of block $116_j$), then the exemplary steps may proceed to step 510. In step 510, the word(s) at address offset w of block $116_j$ may be marked as closed (e.g., by asserting a corresponding one or more bits of the portion 208 of the block $116_j$).

In step 512, the value of C determines which of the exemplary steps is next. If C=0 or 2, then the exemplary steps proceed to step 514. In step 514, it is determined whether a fallow block has been associated with the primary block $116_j$. For example, if the value of the field 212 of the block $116_j$ is above a threshold, it may be determined that no fallow block has been associated with the block $116_j$, but if the value of the field 212 of the block $116_j$ is below the threshold, it may be determined that a fallow block has been associated with the block $116_j$. If there is an associated fallow block, the exemplary steps may proceed to step 522. For non-limiting illustration purposes only, step 522 assumes that block $116_k$ is a fallow block associated with primary block $116_j$. Accordingly, in step 522, the variable ADRS is set to the physical address of the word or words at address offset w in block $116_k$. After step 522, the exemplary steps proceed to step 530 in which the variable C is incremented by one.

Returning to step 514, if there is no fallow block associated with block $116j$, then the exemplary steps may proceed to step 516. In step 516 it is determined whether there is a block available to be associated with the block $116_j$. That is, it is determined whether any of the blocks $116_1$-$116_{M+N}$ is not currently associated with a primary block and is not currently being utilized as a primary block. In instances that there is an available block, the exemplary steps may proceed to step 520. In step 520 an available block may be associated with the block $116_j$. Assuming, for illustration, that block $116_k$ is available, in step 516, block $116_k$ may be associated with the block $116_j$. The association may comprise: (1) assigning an index to the block $116_k$; and (2) storing the index of block $116_k$ in field 212 of the block $116_j$.

Returning to step 516, if none of the blocks $116_1$-$116_{M+N}$ is available to be associated with the block $116_j$, the exemplary steps may proceed to step 518. In step 518, a primary block other than block $116_j$ may be recombined with its associated fallow block. Which block is selected for recombining may, for example, be selected randomly and/or according to an algorithm that achieves wear-leveling of the memory module 112. Exemplary steps for recombining a primary block with its associated fallow block are described below with respect to FIG. 6, for example.

Returning to step 512, if C=1, then the exemplary steps may advance to step 524. In step 524, the block $116_j$ may be recombined with its associated fallow block. Exemplary steps for recombining a primary block with its associated fallow block are described below with respect to FIG. 6, for example.

Returning to step 512, if C=3 then the exemplary steps may advance to step 526. In this regard, the variable C reaching a value of three may indicate that there is file system fault (e.g., due to running out of memory in the module 112). In step 526, a fault indication may be generated and conveyed to the CPU 102 and/or output via the I/O module 106.

Figure 6:
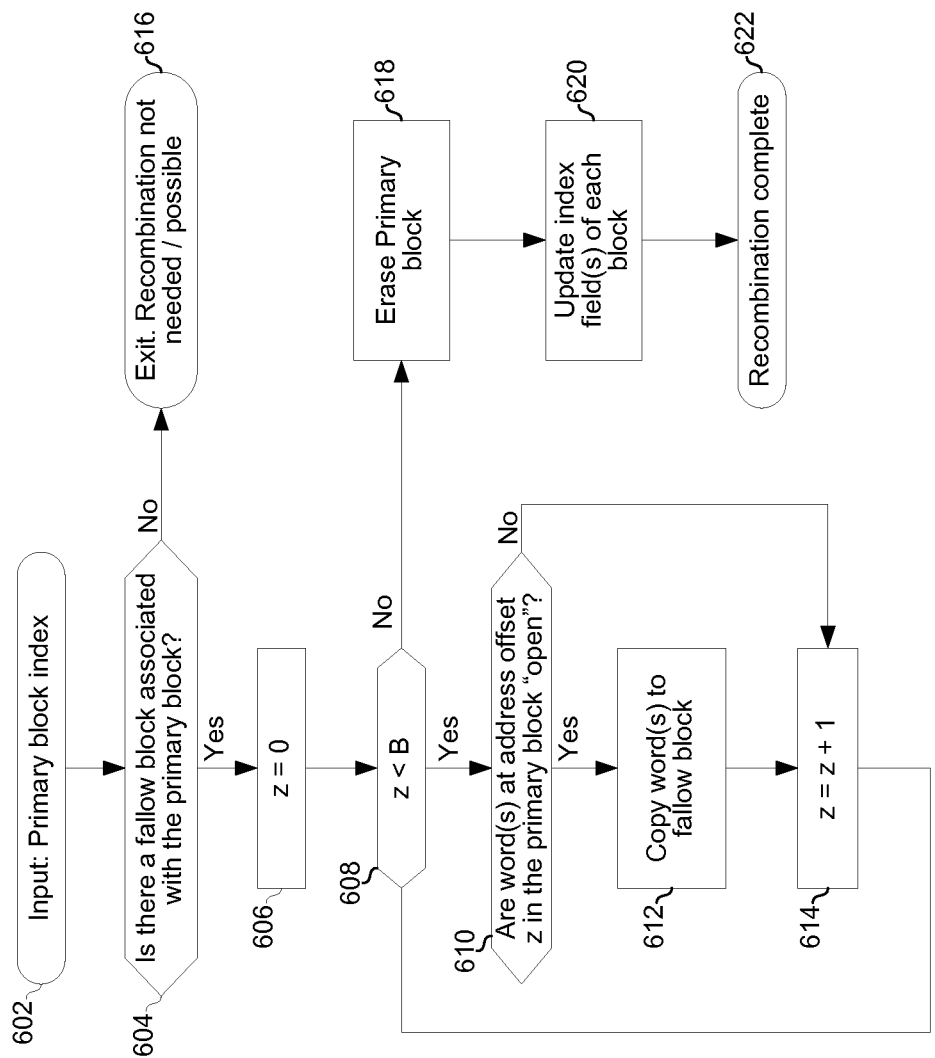
FIG. 6 is a flowchart illustrating exemplary steps for recombining blocks of a memory that is managed in accordance with an embodiment of the invention.

FIG. 6 is a flowchart illustrating exemplary steps for recombining blocks of a memory that is managed in accordance with an embodiment of the invention. The exemplary steps begin with step 602 in which an index of a primary block to be recombined is determined. The index of the block to be recombined may, for example, be determined using a wear-leveling algorithm or based on the target address of a write operation.

In step 604, it is determined whether a fallow block has been associated with the primary block. For example, if the value of the field 212 of the primary block is above a threshold, it may be determined that no fallow block has been associated with the primary block, but if the value of the field 212 of the primary block is below the threshold, it may be determined that a fallow block has been associated with the primary block. If there is no associated fallow block to recombine with the primary block, then the exemplary steps proceed to step 616. If there is an associated fallow block, then the exemplary steps may proceed to step 606.

In step 606, a counter z is initialized to 0. In step 608, z is compared to B, which is the number of words in the portion 202 of the primary block. If z is less than B, then the exemplary steps proceed to step 610. In step 610, it is determined whether the word or words at address offset z in the primary block are open (i.e., whether there has been a failed write attempt to the word(s) since the last erase of the primary block). If the word(s) are open, then the exemplary steps may advance to step 612. In step 612, the contents of the word(s) at address offset z in the primary block may be copied to the word(s) at address offset z in the associated fallow block.

Returning to step 610, if the word(s) at address offset z in the primary block are closed, then the exemplary steps may advance to step 614. That is, closed words are not copied to the associated fallow block. In step 614, z is incremented by 1.

Returning to step 608, if z is greater than or equal to B, then the exemplary steps may proceed to step 618. In step 618, the contents of the primary block may be erased. In a NAND flash architecture this may result in all memory cells of the block being set to 1. In step 620, the index fields 210 and/or 212 of the primary block and the fallow block may be updated. In an exemplary embodiment, the field 210 of the primary block may be swapped with the field 210 of the fallow block, and the field 212 of the primary block may be swapped with the field 212 of the fallow block. In step 622, the recombination is complete.

FIGS. 7A-7G illustrate a series of write operations and a resulting recombination of memory blocks. FIGS. 7A-7G depict two exemplary blocks $116_j$ and $116_k$ and a portion of the table 114. Each of the blocks $116_j$ and $116_k$ has four 8-bit words with address offsets of 0, 1, 2, and 3, respectively.

In FIG. 7A, the block $116_j$ is designated as a primary block and the block $116_k$ is designated as a fallow block, index i1 is associated with block $116_j$, index i4 is associated with block $116_k$, and blocks $116_j$ and $116_k$ are associated with each other (as indicated by block $116_j$ storing index i4 and block $116_k$ storing index i1). FIG. 7A depicts the two blocks in a condition where neither block has been written to since it was last erased.

FIG. 7B depicts the blocks $116_j$ and $116_k$ after a batch write has caused each of words 0-3 of the block $116_j$ to be written to. That is, FIG. 7B depicts the blocks $116_j$ and $116_k$ after execution of an instruction to write words of data to a particular virtual address which resolved to an address offset of 0 of block $116_j$.

FIG. 7C depicts the blocks $116_j$ and $116_k$ after execution of a second write to the same virtual address. Because the word at address offset 1 of block $116_j$ had already been written to, however, the write to block $116_j$ failed. As a result, word 1 of block $116_j$ was marked as closed by asserting bit f1 of block $116_j$ and the data was written to the word 1 of the associated fallow block $116_k$.

FIG. 7D depicts the blocks $116_j$ and $116_k$ after a first stage of a recombination of blocks $116_j$ and $116_k$. The recombination may have been triggered by, for example, a third write instruction targeting the same virtual address (the write is completed in FIG. 7G below). In FIG. 7D, data stored in the open words of block $116_j$ have been copied to the corresponding words of block $116_k$.

FIG. 7E depicts the blocks $116_j$ and $116_k$ after a second stage of a recombination of blocks $116_j$ and $116_k$. In FIG. 7E, block $116_j$ has been erased.

FIG. 7F depicts the blocks $116_j$ and $116_k$ after a third stage of a recombination of blocks $116_j$ and $116_k$. In FIG. 7F, index it has been disassociated from block $116_k$ and associated with block $116_j$. Additionally, the contents of the field 212 of block $116_j$ have been swapped with the contents of the field 212 of the block $116_k$. Thus, in FIG. 7F, block $116_k$ has become a primary block and block $116_j$ has become a fallow block associated with the primary block $116_k$.

FIG. 7G depicts the blocks $116_j$ and $116_k$ after a third write to the same virtual address. Because word 1 of the primary block $116_k$ had already been written to, the write to block $116_k$ failed. As a result, word 1 of block $116_k$ was marked as closed by assertion of bit f1 of block $116_k$ and the data was written to the word 1 of the associated fallow block $116_j$.

FIGS. 8A-8C illustrate an exemplary recombination of blocks of memory. The recombination depicted in FIGS. 8A-8C differs from the recombination shown in FIGS. 7D-7F in that rather than swapping primary and fallow blocks, the fallow block becomes the primary block, a new fallow block is designated and associated with the primary block, and the old fallow block becomes available.

FIG. 8A depicts the blocks $116_j$, $116_k$ and $116_l$ after a first stage of a recombination of blocks $116_j$ and $116_k$, where block $116_j$ is a primary block and block $118_k$ is a fallow block associated with block $116_j$. In FIG. 8A, data stored in the open words of block $116_j$ have been copied to the corresponding words of block $116_k$.

FIG. 8B depicts the blocks $116_j$, $116_k$, and $116_l$ after a second stage of a recombination of blocks $116_j$ and $116_k$. Specifically, block $116_j$ has been erased.

FIG. 8C depicts the blocks $116_j$, $116_k$, and $116_l$ after a third stage of a recombination of blocks $116_j$ and $116_k$. In FIG. 8C, index it has been disassociated from block $116_k$ and associated with block $116_j$, and index i4 has been disassociated with block $116_j$ and associated with block $116_l$. Additionally, the index formerly in field 212 of block $116_j$ has been copied to field 212 of the block $116_k$, and the index i1, now associated with block $116_k$, has been stored to field 212 of block $116_l$. Thus, in FIG. 8C, block $116_k$ has become a primary block, block $116_l$ has become a fallow block associated with the primary block $116_k$, and block $116_j$ is available to be used as a primary block or as a fallow block. Block $116_l$ may have been selected as a fallow block for block $116_k$ based, for example, on a wear-leveling algorithm.

In an exemplary embodiment, an instruction to write data to a particular virtual address of memory 212 may result in the device 100 writing data to a first portion, word 1, of a primary block, block 116$_j$, or to a first portion, word 1, of a fallow block 116$_k$. If word 1 of block 116$_j$ has been erased more recently than it has been written to, the data may be written to word 1 of block 116$_j$, without first erasing block 116$_j$. If word 1 of block 116$_j$ has been written to more recently than it has been erased, and word 1 of block 116$_k$ has been erased more recently than it has been written to, the data may be written to word 1 of block 116$_k$ without first erasing the second block of the memory. If word 1 of block 116$_j$ has been written to more recently than it has been erased, and word 1 of block 116$_k$ has been written to more recently than it has been erased, block 116$_j$ and 116$_k$ may be recombined, and, subsequent to the recombining, the data may be written to word 1 of block 116$_j$. The recombining of blocks 116$_j$ and 116$_k$ may comprise copying at least some of the contents of block 116$_j$ to block 116$_k$, erasing block 116$_j$, and associating, with block 116$_k$, an index that, prior to the recombining, was associated with block 116$_j$.

In executing the write instruction, the device 100 may convert the virtual address to an index associated with block 116$_j$. In executing the write instruction, the device 100 may determine a physical address block 116$_j$ based on the index associated with block 116$_j$. In executing the write instruction, the device 100 may store an index associated with block 116$_k$ in field 212 of block 116$_j$. In executing the write instruction, the device 100 may read an index associated with block 116$_k$ from field 212 of block 116$_j$, and determine a physical address of block 116$_k$ using the index.

In an exemplary embodiment, one or more circuits of a device 100 may comprise a memory 112, where a first portion 202 of a first block 116$_j$ of the memory 112 may store program code and/or program data, a second portion 206 of the first block 116$_j$ may store an index associated with a second block 116$_k$ of the memory 112, and a third portion 208 of the first block 116$_j$ may store an indication of a write status of the first portion 208. Each bit of the third portion 208 may indicate whether an attempt to write data to a corresponding one or more words of the first portion 202 of the first block 116$_j$ has failed since the last erase of the corresponding one or more words of the first portion 202 of the first block 116$_j$. Regarding the second block 116$_k$, a first portion 202 of the second block 116$_k$ may store program code and/or program data, a second portion 206 of the second block 116$_k$ may store an index associated with the first block 116$_j$, and a third portion of the second block 116$_k$ may store an indication of a write status of the first portion 202 of the second block 116$_k$.

The one or more circuits of the device 100 may be operable to receive an instruction to write data to the memory 112. In response to the received instruction, the one or more circuits may write the data to a word of the first portion 202 of the first block 116$_j$ if the word of the first portion 202 of the first block 116$_j$ has been erased more recently than it has been written to, and write the data to a word of the first portion 202 of the second block 116$_k$ if the word of the first portion 202 of the first block 116$_j$ has been written to more recently than it has been erased. Additionally or alternatively, in response to the received write instruction, the one or more circuits may detect that (i) a word of the first portion 202 of the first block 116$_j$ has been written to more recently than it has been erased, and (ii) a word of the first portion 202 of the second block 116$_k$ has been written to more recently than it has been erased. In response to the detection, the one or more circuits may recombine the first block 116$_j$ and the second block 116$_k$ in response to the detection. The recombining may comprise copying at least some of the contents of the first block 116$_j$ to the second block 116$_k$, erasing the first block 116$_j$, and associating the second block 116$_k$ with an index formerly associated with the first block 116$_k$. The recombining may also comprises changing an index stored in the second portion 206 of the second block 116$_k$. The index stored in the second portion 206 of the second block 116$_k$ may be changed to an index that is associated with a third block 116$_1$ (e.g., index i4 in FIG. 8C) and/or that was former formerly associated with the second block 116$_k$ (e.g., index i4 in FIG. 7G).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for memory management.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   performing by one or more circuits comprising memory, in response to an instruction to write data to said memory:
   if a first portion of a first block of said memory has been erased more recently than it has been written to, writing data to said first portion of said first block of said memory without first erasing said first block of said memory;
   if said first portion of said first block of said memory has been written to more recently than it has been erased, and a first portion of a second block of said memory has been erased more recently than it has been written to, writing data to said first portion of said second block of memory without first erasing said second block of said memory; and if said first portion of said first block of said memory has been written to more recently than it has been erased, and said first portion of said second block of said memory has been written to more recently than it has been erased, recombining said first block of said memory and said second block of said memory and, subsequent to said recombining, writing said data to said first portion of said first block of said memory;

storing an index associated with a said second block of said memory in said first block of said memory.

2. The method of claim 1, wherein said recombining said first block of said memory and said second block of said memory comprises:

copying at least some of the contents of said first block of said memory to said second block of said memory;

erasing said first block of said memory; and associating an index with said second block of said memory, wherein said index was associated with said first block of said memory prior to said recombining.

3. The method of claim 1, comprising performing by said one or more circuits in response to said instruction to write said data to said memory:

converting a virtual memory address of said instruction to an index associated with said first block of said memory.

4. The method of claim 3, comprising performing by said one or more circuits in response to said instruction to write said data to said memory:

determining a physical address of said first block of said memory based on said index associated with said first block of said memory.

5. A method comprising:

performing by one or more circuits comprising memory in response to an instruction to write said data to said memory:

if a first portion of a first block of said memory has been erased more recently than it has been written to, writing data to said first portion of said first block of said memory without first erasing said first block of said memory;

if said first portion of said first block of said memory has been written to more recently than it has been erased, and a first portion of a second block of said memory has been erased more recently than it has been written to, writing data to said first portion of said second block of memory without first erasing said second block of said memory;

if said first portion of said first block of said memory has been written to more recently than it has been erased, and said first portion of said second block of said memory has been written to more recently than it has been erased, recombining said first block of said memory and said second block of said memory and, subsequent to said recombining, writing said data to said first portion of said first block of said memory;

reading an index associated with said second block of said memory from said first block of said memory; and determining a physical address of said second block of said memory using said index of said second block of said memory.

6. The method of claim 1, wherein said memory is a NAND flash memory.

7. The method of claim 1, wherein erasing any memory cell of said first block of said memory requires erasing all memory cells of said first block of said memory.

8. The method of claim 1, wherein erasing any memory cell of said second block of said memory requires erasing all memory cells of said second block of said memory.

9. A system comprising:

one or more circuits comprising a memory, wherein:

a first portion of a first block of said memory stores program code and/or program data;

a second portion of said first block of said memory stores an index associated with a second block of said memory; and a third portion of said first block of said memory stores an indication of a write status of said first portion of said first block of said memory;

a first portion of said second block of said memory stores program code and/or program data;

a second portion of said second block of said memory stores an index associated with said first block of said memory;

a third portion of said second block of said memory stores an indication of a write status of said first portion of said second block of said memory.

10. The system of claim 9, wherein each bit of said third portion of said first block of said memory indicates whether an attempt to write data to a corresponding one or more words of said first portion of said first block of said memory has failed since the last erase of said corresponding one or more words of said first portion of said first block of said memory.

11. The system of claim 9, wherein said one or more circuits are operable to:

receive an instruction to write data to said memory;

write said data to a word of said first portion of said first block of said memory if said word of said first portion of said first block of said memory has been erased more recently than it has been written to; and write said data to a word of a first portion of said second block of said memory if said word of said first portion of said first block of said memory has been written to more recently than it has been erased.

12. The system of claim 9, wherein said one or more circuits are operable to:

receive an instruction to write data to said memory;

detect that (i) a word of said first portion of said first block of said memory has been written to more recently than it has been erased, and (ii) a word of said first portion of said second block of said memory has been written to more recently than it has been erased; and recombine said first block of said memory and said second block of said memory in response to said detection.

13. The system of claim 12, wherein said recombining said first block of said memory and said second block of said memory comprises:

copying at least some of the contents of said first block of said memory to said second block of said memory;

erasing said first block of said memory; and associating said second block of said memory with an index formerly associated with said first block of said memory.

14. The system of claim 13, wherein said recombining said first block of said memory and said second block of said memory comprises changing an index stored in said second portion of said second block of said memory.

15. The system of claim 14, wherein said index stored in said second portion of said second block of said memory is changed to an index associated with a third block of said memory.

16. The system of claim 14, wherein said index stored in said second portion of said second block of said memory is changed to an index formerly associated with said second block of said memory.

17. The system of claim 14, wherein said new index is randomly selected from a plurality of available indices.

18. The system of claim 9, wherein:
said memory is a NAND flash memory; and
said first block is located at a single, particular physical address of said NAND flash memory.

* * * * *